May 7, 1929.    J. T. CLARK    1,712,199
LEAD JOINT RUNNER
Filed Sept. 14, 1926

John T. Clark
Inventor

By Stevens and Batchelor
Attorneys

Patented May 7, 1929.

1,712,199

UNITED STATES PATENT OFFICE.

JOHN T. CLARK, OF CHICAGO, ILLINOIS.

LEAD-JOINT RUNNER.

Application filed September 14, 1926. Serial No. 135,477.

My invention relates to the class of devices used in forming the joint in a soil pipe or the like, where molten lead is poured into the annular space between the spigot and bell of the two adjoining pipes. In this type of joints, a rope or flexible packing belt is tightly clamped about the spigot end of a pipe section and close to the bell end of the adjacent pipe section. The position of the rope or belt is such as to leave an opening in which the lead is poured, and it is one object of this invention to provide an improved rope or belt which will seal the entrance to the joint against diversion or leakage of the molten metal away from the joint.

A further object of the invention is to incorporate a clamp for the rope or belt which permits a quick mounting upon, and tightening about the pipe.

Another object of the invention is to embody in the device a sealing element which adjusts itself to pipes of different diameters within the customary limits.

A final, but nevertheless important object of the invention is to construct the same of few and simple parts, in order that it may be inexpensively manufactured and easily handled by those skilled in the art.

With the above objects in view, and any others which may suggest themselves from the specification and claims to follow, a better understanding of the invention may be gained by reference to the accompanying drawing, in which—

Figure 3 is a fragmental section on the line 3—3 of Figure 2, portions of the runner being broken away to expose the sealing element previously referred to.

Figure 1:
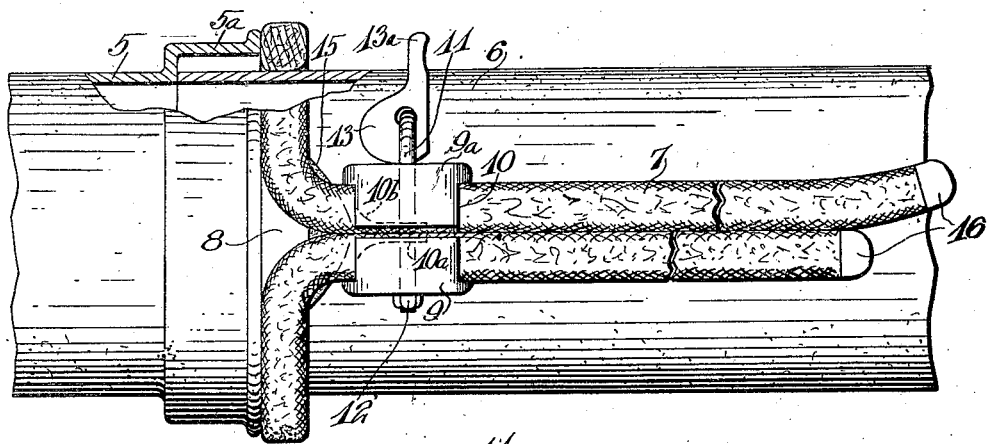
Figure 1 is a plan view of my improved joint runner as mounted on a pipe joint, a portion of the view being broken away.
Figure 2:
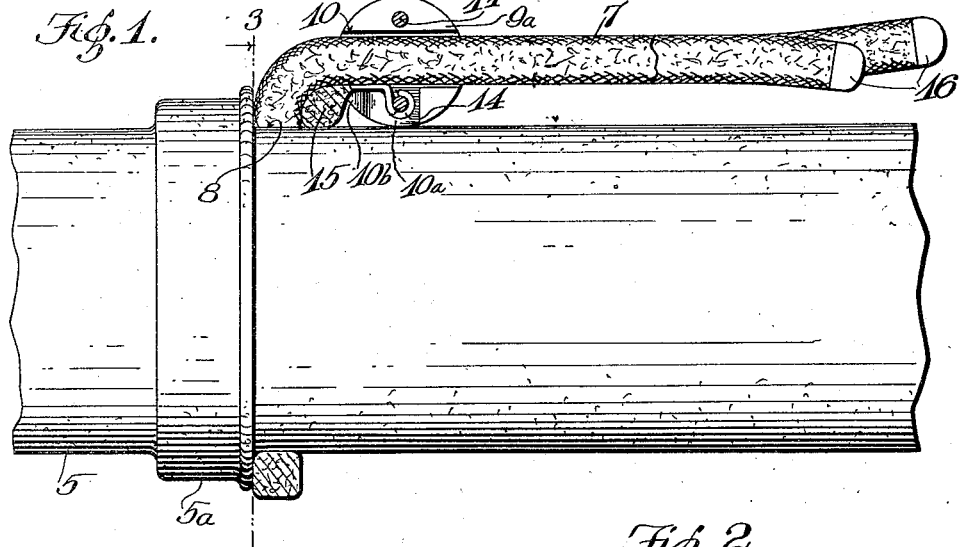
Figure 2 is an elevation of the device as applied, partly in section.
Figure 3:
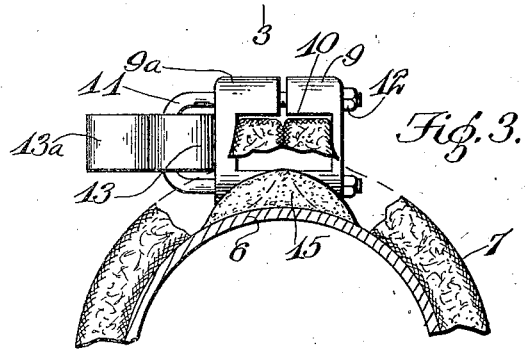

Referring specifically to the drawing, the numeral 5 denotes the bell-end and 6 the spigot-end of the pipe sections joined. The packing rope 7 is usually of asbestos or other fire-resisting material, and is looped around the pipe 6 and at the same time positioned to abut the bell $5^a$ of the section 5 whereby to seal the annular opening thereof all around except at the top, where the rope sections meet, leaving a triangular opening 8 where the lead is poured.

In departing from the site of the joint, the packing rope sections 7 pass through the jaws 9 and $9^a$ of a drum-shaped clamp. The latter is made in solid or block form, yet of aluminum or other light metal for facility in handling, and its tendency to hold to the rope when carried or laid around.

The clamp jaws 9 and $9^a$ are recessed as indicated at 10 to receive the rope sections side by side, and operate on a shackle 11, secured outside the jaws 10 by nuts 12. The crown of the shackle receives an eccentric roller 13, elongated at $13^a$ to provide a handle. In the position shown, the roller has tightened the jaws on the packing rope sections, but the grip on these may be loosened by swinging the roller to the right, as viewed in Figure 1.

The lower leg of the shackle 11 receives loosely between the clamp jaws an eye 14 of strong wire, the stem of the eye being embedded in a shield 15 of material similar to that from which the packing rope is made. The shield is arch-shaped, tapers toward its ends, and is capable of flexing upon pressure to alter its curvature to conform to the conditions under which the pressure is exerted. Thus, when the packing rope is applied as shown, the shield 15 is positioned under the turn or bend of the rope sections leading from the pipe-encircling loop into the clamp, and as the rope sections are drawn up for tightening in the clamp, the shield is packed snugly between them and the pipe section 6 so as to form a sealed barrier for any molten metal having a tendency to flow away from the course for which it is intended. The flow is thus confined to the joint, and the job is done quickly, safely and economically.

The recess 10 between the clamp jaws 9 and $9^a$ has a branch $10^a$ which provides clearance for the free movement of the shield eye 14 even when the jaws are closely gathered; and this recess is flared in the direction of the shield, as indicated at $10^b$, to permit the shield to drop away from the rope when the device has been removed from the pipe, leaving the rope free for handling or adjustment. Prior to the use of the device, one section of the rope carries the clamp in loose condition, so that only the other section need be passed through the clamp when the device has been applied to the pipe. To facilitate the insertion of the rope sections into the clamp jaws, the rope ends may be fitted with thimbles 16 of metal, these preventing the fibres of the rope material from spreading and breaking away.

A device is thus had which is simple in construction, easy to apply and efficient in use. The preferred form of the invention has been illustrated and described, but it will be obvious that some minor changes or refinements may be made during the process of its commercial development without, however, departing from the principle of the invention; and it is my intention to include such changes and refinements as coming within the scope and spirit of the appended claims.

I claim:—

1. Means for sealing a lead-joint runner for pipes in which a heat-resisting packing rope is looped about the pipe and gathered over the same to extend in a lateral direction, and a clamp used to secure the rope extensions; comprising a heat-resisting shield pivotally-hung from the clamp and adapted to be inserted between the rope and pipe in the hollow formed between the loop and the extension thereof.

2. Means for sealing a lead-joint runner for pipes in which a heat-resisting packing rope is looped about the pipe and gathered over the same to extend in a lateral direction, a clamp used to secure the rope extensions, and a clamp section extended under the latter; comprising a heat-resisting shield adapted to be inserted between the rope and the pipe in the hollow formed between the loop and the extension thereof, and a stem projecting from the shield and linked to said clamp section.

In testimony whereof I affix my signature.

JOHN T. CLARK.